United States Patent
Sasaki

(10) Patent No.: US 8,432,384 B2
(45) Date of Patent: Apr. 30, 2013

(54) ACTIVE MATRIX SUBSTRATE AND DISPLAY DEVICE

(75) Inventor: Takashi Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 232 days.

(21) Appl. No.: 12/919,024

(22) PCT Filed: Nov. 6, 2008

(86) PCT No.: PCT/JP2008/070181
§ 371 (c)(1),
(2), (4) Date: Aug. 24, 2010

(87) PCT Pub. No.: WO2009/116201
PCT Pub. Date: Sep. 24, 2009

(65) Prior Publication Data
US 2011/0032226 A1   Feb. 10, 2011

(30) Foreign Application Priority Data
Mar. 21, 2008  (JP) .................. 2008-073232

(51) Int. Cl.
*G09G 3/36* (2006.01)
*G06F 3/038* (2006.01)
*G09G 5/00* (2006.01)

(52) U.S. Cl.
USPC ............................................ 345/205; 345/87

(58) Field of Classification Search .................. None
See application file for complete search history.

(56) References Cited

U.S. PATENT DOCUMENTS

| | | | | |
|---|---|---|---|---|
| 5,233,338 A * | 8/1993 | Surguy | ............................ | 345/88 |
| 7,283,115 B2 | 10/2007 | Morii | | |
| 7,605,790 B2 * | 10/2009 | Hsu | ................................. | 345/92 |
| 2002/0105508 A1 | 8/2002 | Inada | | |
| 2004/0155851 A1 * | 8/2004 | Morii | .............................. | 345/99 |
| 2006/0041805 A1 | 2/2006 | Song | | |
| 2007/0152944 A1 | 7/2007 | Kwon et al. | | |
| 2009/0066679 A1 * | 3/2009 | Kanazawa et al. | ............ | 345/206 |

FOREIGN PATENT DOCUMENTS

| | | |
|---|---|---|
| JP | 10-048595 A | 2/1998 |
| JP | 2003-058119 A | 2/2003 |
| JP | 2003-186416 A | 7/2003 |
| JP | 2006-337710 A | 12/2006 |

OTHER PUBLICATIONS

Official Communication issued in International Patent Application No. PCT/JP2008/070181, mailed on Dec. 16, 2008.

* cited by examiner

*Primary Examiner* — Kent Chang
*Assistant Examiner* — Nathan Brittingham
(74) *Attorney, Agent, or Firm* — Keating & Bennett, LLP

(57) ABSTRACT

An active matrix substrate (5) for use as a substrate of a liquid crystal panel (display panel) (2) includes a plurality of source wirings (data wirings) (S) and a plurality of gate wirings (scanning wirings) (G) arranged in a matrix and a plurality of pixels (P) provided in the vicinities of intersections of the source wirings (S) and the gate wirings (G). A plurality of gate drivers (scanning wiring drive circuits) (24-1 to 24-6) that sequentially output scanning signals to a plurality of the gate wirings (G) in a predetermined scanning direction are provided along the scanning direction. Further, each of the gate drivers (24-1 to 24-6) has a vacant terminal that is not connected to the gate wiring (G).

4 Claims, 12 Drawing Sheets

ACTIVE MATRIX SUBSTRATE AND DISPLAY DEVICE

TECHNICAL FIELD

The present invention relates to an active matrix substrate in which a plurality of data wirings and a plurality of scanning wirings are arranged in a matrix, and a display device using the same.

BACKGROUND ART

Recently, for example, a liquid crystal display device has been used widely in a liquid crystal television, a monitor, a mobile phone, and the like as a flat panel display having features such as thinness and a light weight as compared with a conventional Broun tube. A known liquid crystal display device of this kind uses, in a liquid crystal panel as a display panel, an active matrix substrate in which a plurality of data wirings and a plurality of scanning wirings are arranged in a matrix, and pixels, each having a switching element such as a TFT (Thin Film Transistor), are arranged in a matrix in the vicinities of intersections of the data wirings and the scanning wirings (for example, see JP 2003-58119 A).

Further, as described in JP 2006-337710 A, for example, the conventional active matrix substrate includes gate drives at both ends of a display portion (effective display region) of the liquid crystal panel so as to drive the scanning wirings. More specifically, in this conventional active matrix substrate, the gate drivers on one side of the display portion are connected to the scanning wirings in the odd-numbered lines, while the gate drivers on the other side of the display portion are connected to the scanning wirings in the even-numbered lines. In this conventional active matrix substrate, the gate drivers on the both sides sequentially output scanning signals, thereby performing a scanning operation.

Further, in the conventional active matrix substrate, the gate drivers on the both sides are connected to each other via the scanning wirings. This prevents an increase in circuit scale even when the gate drivers are provided on the both sides of the display portion, making it possible to provide a smaller liquid crystal display device.

DISCLOSURE OF INVENTION

Problem to be Solved by the Invention

However, in the conventional active matrix substrate as described above, the scanning operation by the gate drivers (scanning wiring drive circuits) may not be performed suitably in the case where the panel is made larger (including the case where the number of the pixels is increased) for the purpose of achieving a larger-screen and higher-definition liquid crystal display device, for example.

Specifically, in the conventional active matrix substrate, when the number of the scanning wirings is increased with an increased number of the pixels, or when the panel is made larger for the purpose of achieving a larger screen, it becomes necessary to make a connection wiring, which connects each of the gate drivers on the both sides and each of the scanning wirings, finer or longer, and it may cause a significant increase in the resistance value of the connection wiring. More specifically, in the conventional active matrix substrate, when the panel is made larger, a distance between the scanning wirings provided on one end side in a scanning direction (for example, a row direction of the matrix) and the scanning wirings provided on the other end side increases significantly, relative to the dimension of the gate drivers in the scanning direction. As a result, in the conventional active matrix substrate, for example, the connection wiring that connects each of the scanning wirings provided on the one end side and each of the gate drivers becomes longer, resulting in an increase in the resistance value of the connection wiring.

Further, an increase in the number of the scanning wirings to be connected to each of the gate drivers makes it necessary to narrow a space (pitch) between the adjacent two connection wirings and hence to reduce a width dimension (cross sectional area) of a plurality of the connection wirings to be connected respectively to a plurality of the scanning wirings. In other words, in the conventional active matrix substrate, it is necessary to make a plurality of the entire connection wirings finer in accordance with an increase in the number of the pixels, which may result in a significant increase in the resistance value of the connection wirings. As a result, in the conventional active matrix substrate, the scanning signals may be reduced significantly depending on the distance from each of the gate drivers, which may make it impossible to perform a suitable scanning operation.

In order to address an increase in the resistance value as described above, a voltage value of the scanning signals from each of the gate drivers may be increased. However, this necessitates a significant increase in the cost each of the gate drivers and an unnecessary increase in the dielectric strength each of the connection wirings, the scanning wirings, and the like. Thus, another problem may arise in that the active matrix substrate may be made more complicated and larger.

In view of the above-described problems, it is an object of the present invention to provide an active matrix substrate that enables a suitable scanning operation even when a panel is made larger, and a display device using the same.

Means for Solving Problem

In order to achieve the above-described object, an active matrix substrate according to the present invention is for use as a substrate of a display panel. The substrate includes a plurality of data wirings and a plurality of scanning wirings arranged in a matrix and a plurality of pixels provided in the vicinities of intersections of the data wirings and the scanning wirings. A plurality of scanning wiring drive circuits that sequentially output scanning signals to a plurality of the scanning wirings in a predetermined scanning direction are provided along the scanning direction, and each of a plurality of the scanning wiring drive circuits has a vacant terminal that is not connected to the scanning wiring.

According to the active matrix substrate configured as described above, a plurality of the scanning wiring drive circuits are provided along the scanning direction. Further, each of a plurality of the scanning wiring drive circuits has the vacant terminal that is not connected to the scanning wiring. Therefore, unlike the conventional example, even when a panel is made larger, it is possible to suppress an increase in the resistance value of a connection wiring that connects the scanning wiring drive circuit and the scanning wiring. Consequently, unlike the conventional example, it is possible to configure easily the active matrix substrate that enables a suitable scanning operation even when a panel is made larger.

Further, in the above-described active matrix substrate, among a plurality of the scanning wiring drive circuits, in the scanning wiring drive circuit provided on one end side of the scanning direction, a terminal that is connected to the scanning wiring may be provided on either one of the one end side and the other end side of the scanning direction, and in the scanning wiring drive circuit provided on the other end side of the scanning direction, a terminal that is connected to the scanning wiring may be provided on the other of the one end side and the other end side of the scanning direction.

In this case, it is possible to reverse the scanning direction, so that upside-down driving in which a video is displayed upside down exactly can be performed easily.

Further, in the above-described active matrix substrate, among a plurality of the scanning wiring drive circuits, in the scanning wiring drive circuit provided on the one end side of the scanning direction, the terminal that is connected to the scanning wiring and the vacant terminal that is not connected to the scanning wiring preferably are provided sequentially in this order along the scanning direction, and in the scanning wiring drive circuit provided on the other end side of the scanning direction, the vacant terminal that is not connected to the scanning wiring and the terminal that is connected to the scanning wiring preferably are provided sequentially in this order along the scanning direction.

In this case, it is possible to reverse the scanning direction, so that upside-down driving in which a video is displayed upside down exactly can be performed more easily.

Further, in the above-described active matrix substrate, each of a plurality of the scanning wiring drive circuits preferably has an equal number of the terminal that is connected to the scanning wiring and an equal number of the vacant terminal that is not connected to the scanning wiring.

This allows all the scanning wiring drive circuits to be loaded uniformly and enables an easy scanning operation.

Further, in the above-described active matrix substrate, each of a plurality of the scanning wiring drive circuits may have the terminal that is connected to the scanning wiring and the vacant terminal that is not connected to the scanning wiring in equal numbers.

This makes it possible to simplify the operation of connecting the scanning wiring drive circuit and the scanning wiring and enables an easier scanning operation.

Further, a display device according to the present invention is provided with a display portion. The active matrix substrate according to any one of the above-described configurations is used in the display portion.

In the display device configured as described above, the active matrix substrate that enables a suitable scanning operation even when a panel is made larger is used in the display portion. Thus, it is possible to configure easily the display device that has excellent display performance even in the case of achieving a larger screen and/or higher definition.

Effects of the Invention

According to the present invention, it is possible to provide an active matrix substrate that enables a suitable scanning operation even when a panel is made larger, and a display device using the same.

DESCRIPTION OF THE INVENTION

Hereinafter, preferred embodiments of an active matrix substrate and a display device according to the present invention will be described with reference to the drawings. It should be noted that the following description is directed to the case where the present invention is applied to a transmission type liquid crystal display device by way of example. Further, the size and size ratio of the constituent members in each figure do not exactly reflect those of actual constituent members.

FIRST EMBODIMENT

Figure 1:
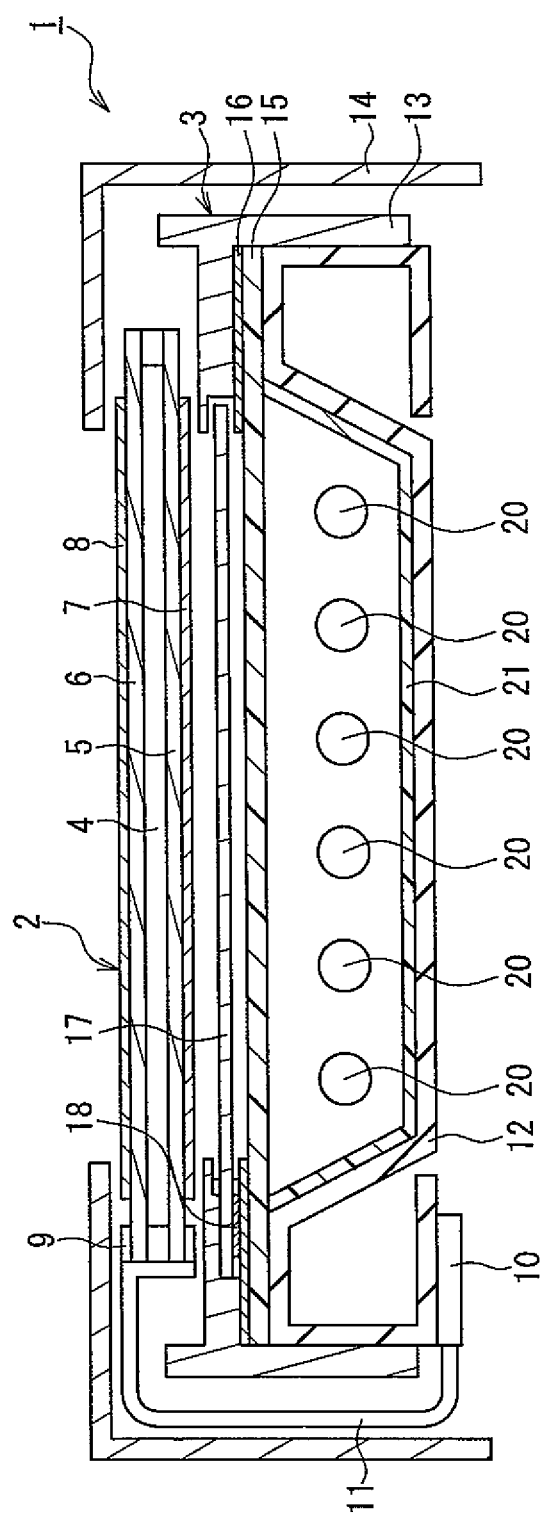
FIG. 1 is a schematic cross-sectional view illustrating a liquid crystal display device according to a first embodiment of the present invention.

FIG. 1 is a schematic cross-sectional view illustrating a liquid crystal display device according to a first embodiment of the present invention. In the figure, a liquid crystal display device 1 of the present embodiment includes a liquid crystal panel 2 as a display portion that is located with the upper side in the figure defined as a viewing side (display surface side), and an illuminating device 3 that is arranged on the non-display surface side of the liquid crystal panel 2 (lower side in the figure) and generates illumination light to illuminate the liquid crystal panel 2.

The liquid crystal panel 2 includes a liquid crystal layer 4, an active matrix substrate 5 of the present invention and a color filter substrate 6 between which the liquid crystal layer 4 is sandwiched, and polarizing plates 7 and 8 provided respectively on outer surfaces of the active matrix substrate 5 and the color filter substrate 6. Further, the liquid crystal panel 2 includes a driver device 9 for driving the liquid crystal panel 2, and a drive circuit device 10 connected to the driver device 9 via a flexible printed board 11, so that the liquid crystal layer 4 can be driven on a pixel basis. In the liquid crystal panel 2, a polarization state of the illumination light incident through the polarizing plate 7 is modulated by the liquid crystal layer 4, and an amount of light passing through the polarizing plate 8 is controlled, whereby a desired image is displayed.

It should be noted that the liquid crystal panel 2 may be in any liquid crystal mode and have any pixel structure. Also, the liquid crystal panel 2 may be in any drive mode. In other words, the liquid crystal panel 2 may be any liquid crystal panel that can display information. Thus, a detailed structure of the liquid crystal panel 2 is not shown in FIG. 1, and a description thereof will be omitted.

The illuminating device 3 includes a bottomed chassis 12 with the upper side in the figure (liquid crystal panel 2 side) opened, and a frame 13 placed on the liquid crystal panel 2 side of the chassis 12. Further, the chassis 12 and the frame 13 are made of a metal or a synthetic resin and are sandwiched by a bezel 14 having an L-shape in cross section with the liquid crystal panel 2 located above the frame 13. Thus, the illuminating device 3 is assembled with the liquid crystal panel 2, so that they are integrated into the transmission type liquid crystal display device 1 in which the illumination light from the illuminating device 3 is incident on the liquid crystal panel 2.

Further, the illuminating device 3 includes a diffusion plate 15 located so as to cover the opening of the chassis 12, an optical sheet 17 located above the diffusion plate 15 on the liquid crystal penal 2 side, and a reflecting sheet 21 provided on an inner surface of the chassis 12. In the illuminating device 3, a plurality of (for example, six) cold cathode fluorescent tubes 20 are provided inside the chassis 12 below the liquid crystal panel 2, thereby forming the direct type illuminating device 3. In the illuminating device 3, light from the cold cathode fluorescent tubes 20 is output as the illumination light from a light-emitting surface of the illuminating device 3 that is arranged so as to be opposed to the liquid crystal panel 2.

Although the above description is directed to the configuration using the direct type illuminating device 3, the present embodiment is not limited thereto. Instead, an edge-light type illuminating device having a light guiding plate may be used. Further, an illuminating device having light sources other than the cold cathode fluorescent tubes, such as a hot cathode fluorescent tube and an LED, can be used.

The diffusion plate 15, which is made of, for example, a rectangular-shaped synthetic resin or glass material having a thickness of about 2 mm, diffuses the light from the cold cathode fluorescent tubes 20 and outputs the light to the optical sheet 17 side. Further, four sides of the diffusion plate 15 are placed on a frame-shaped surface of the chassis 12 provided on the upper side thereof, and the diffusion plate 15 is incorporated in the illuminating device 3 while being sandwiched between the frame-shaped surface of the chassis 12 and an inner surface of the frame 13 with a pressure member 16 capable of being deformed elastically interposed therebetween. Further, the diffusion plate 15 is supported substantially at its center by a transparent support member (not shown) located inside the chassis 12, whereby the diffusion plate 15 is prevented from being bent toward the inside of the chassis 12.

Further, the diffusion plate 15 is held so as to be movable between the chassis 12 and the pressure member 16. Even when the diffusion plate 15 is expanded/contracted (deformed plastically) due to the influence of heat caused by heat generation in the cold cathode fluorescent tubes 20, temperature rise inside the chassis 12, and the like, the plastic deformation is absorbed by the elastic deformation of the pressure member 16, whereby a decrease in diffusion of the light from the cold cathode fluorescent tubes 20 is minimized. Further, it is preferred to use the diffusion plate 15 made of a glass material, which is more resistant to heat as compared with a synthetic resin, since warpage, yellowing, thermal deformation, and the like caused by the influence of heat are unlikely to occur.

The optical sheet 17 includes a focusing sheet formed of, for example, a synthetic resin film having a thickness of about 0.5 mm and is configured to increase the brightness of the illumination light to the liquid crystal panel 2. Further, on the optical sheet 17, known optical sheet materials such as a prism sheet, a diffusion sheet, and a polarizing sheet for enhancing the display quality on the display surface of the liquid crystal panel 2, for example, are laminated appropriately, if required. The optical sheet 17 is configured to convert the light output from the diffusion plate 15 into plane-shaped light having a predetermined brightness (for example, 10000 $cd/m^2$) or more and having a uniform brightness and to allow the converted light to be incident on the liquid crystal panel 2 side as the illumination light. Besides the above description, for example, an optical member such as a diffusion sheet for adjusting the viewing angle of the liquid crystal panel 2 may be laminated appropriately above (on the display surface side of) the liquid crystal panel 2.

Further, the optical sheet 17 is provided with a protrusion protruding to the left side in the figure at the center on the left end side in FIG. 1, which is to be the upper side during actual use of the liquid crystal display device 1, for example. In the optical sheet 17, only the protrusion is sandwiched between the inner surface of the frame 13 and the pressure member 16 with an elastic material 18 interposed therebetween, and the optical sheet 17 is incorporated in the illuminating device 3 so as to be capable of expanding/contracting. Thus, the optical sheet 17 is configured in such a manner that, even when the expansion/contraction (plastic) deformation occurs due to the influence of heat caused by heat generation in the cold cathode fluorescent tubes 20 and the like, the optical sheet 17 is capable of expanding/contracting freely with respect to the protrusion, whereby wrinkles, warpage, and the like are minimized in the optical sheet 17. Consequently, in the liquid crystal display device 1, it is possible to minimize degradation in display quality such as non-uniform brightness on the display surface of the liquid crystal panel 2 due to warpage and the like of the optical sheet 17.

Each of the cold cathode fluorescent tubes 20 is of a straight-tube type, and electrode portions (not shown) provided at both ends thereof are supported outside the chassis 12. Also, each of the cold cathode fluorescent tubes 20 is configured to have a small diameter of about 3.0 to 4.0 mm so as to have excellent light-emission efficiency. The cold cathode fluorescent tubes 20 are held inside the chassis 12 while being kept at predetermined distances from the diffusion plate 15 and the reflecting sheet 21 by a light source holder not shown. Further, the cold cathode fluorescent tubes 20 are arranged so that a longitudinal direction thereof is parallel to a direction perpendicular to the direction of gravity. This arrangement prevents mercury (vapor) sealed inside each of the cold cathode fluorescent tubes 20 from being concentrated on one end side in the longitudinal direction due to the action of gravity, resulting in significantly improved lamp life.

The reflecting sheet 21, which is formed of, for example, a thin metal film of aluminum, silver, or the like having a thickness of about 0.2 to 0.5 mm with a high light reflectance, functions as a reflector that reflects the light from the cold cathode fluorescent tubes 20 towards the diffusion plate 15. Thus, in the illuminating device 3, the reflecting sheet 21 can reflect the light emitted from the cold cathode fluorescent tubes 20 to the diffusion plate 15 side efficiently so as to enhance the use efficiency of the light and the brightness in the diffusion plate 15. Besides the above description, instead of the thin metal film, a reflecting sheet material of a synthetic resin may be used, or alternatively, for example, a coating such as a white coating having a high light reflectance may be applied to the inner surface of the chassis 12 so that the inner surface functions as a reflector.

Next, the active matrix substrate 5 of the present embodiment will be described specifically also with reference to FIGS. 2 and 3.

Figure 2:
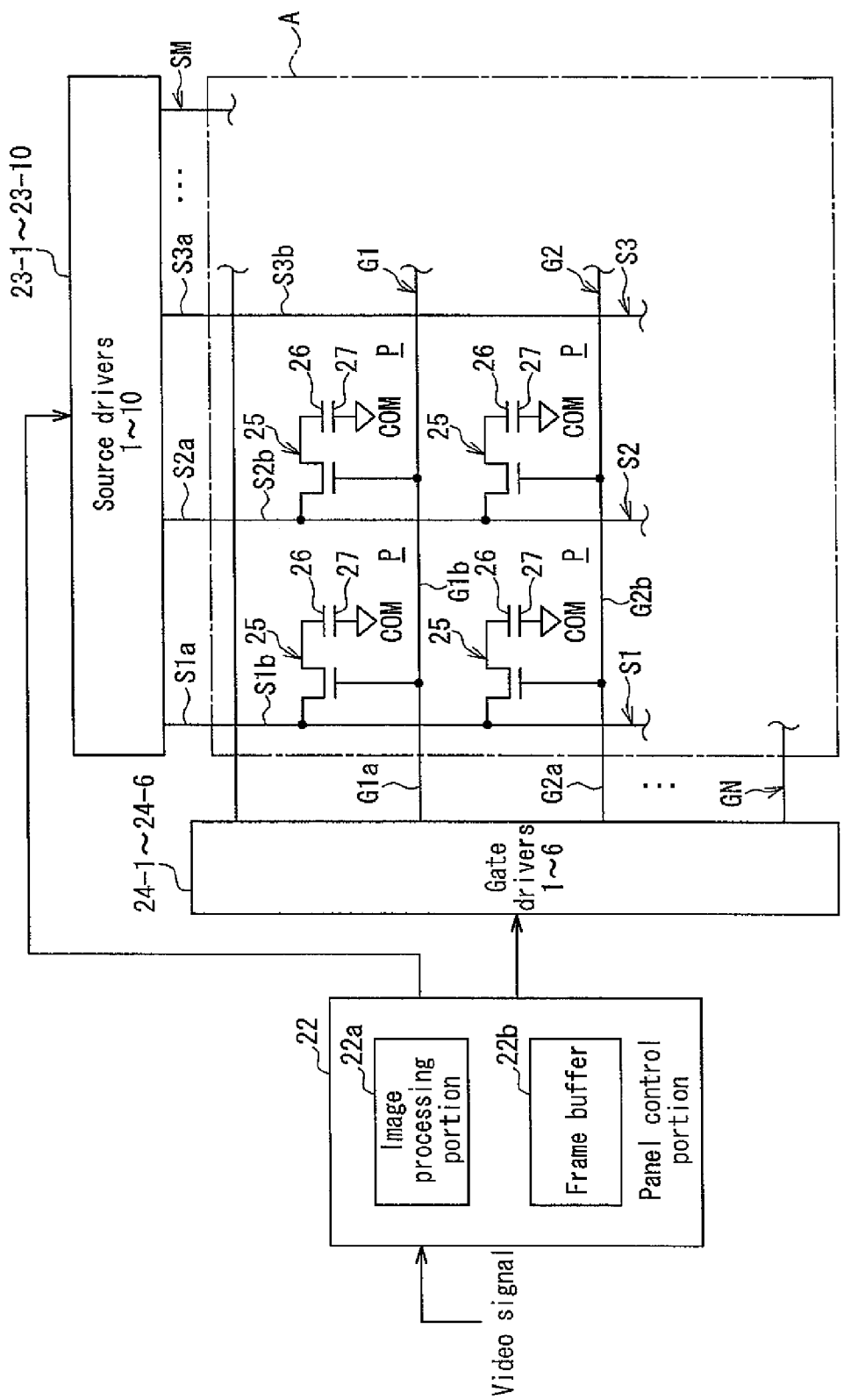
FIG. 2 is a view illustrating a configuration of an active matrix substrate and main portions of the liquid crystal display device according to the first embodiment.

FIG. 2 is a view illustrating a configuration of the active matrix substrate and main portions of the liquid crystal display device according to the first embodiment. FIG. 3 is a view illustrating a specific configuration of the active matrix substrate.

Figure 3:
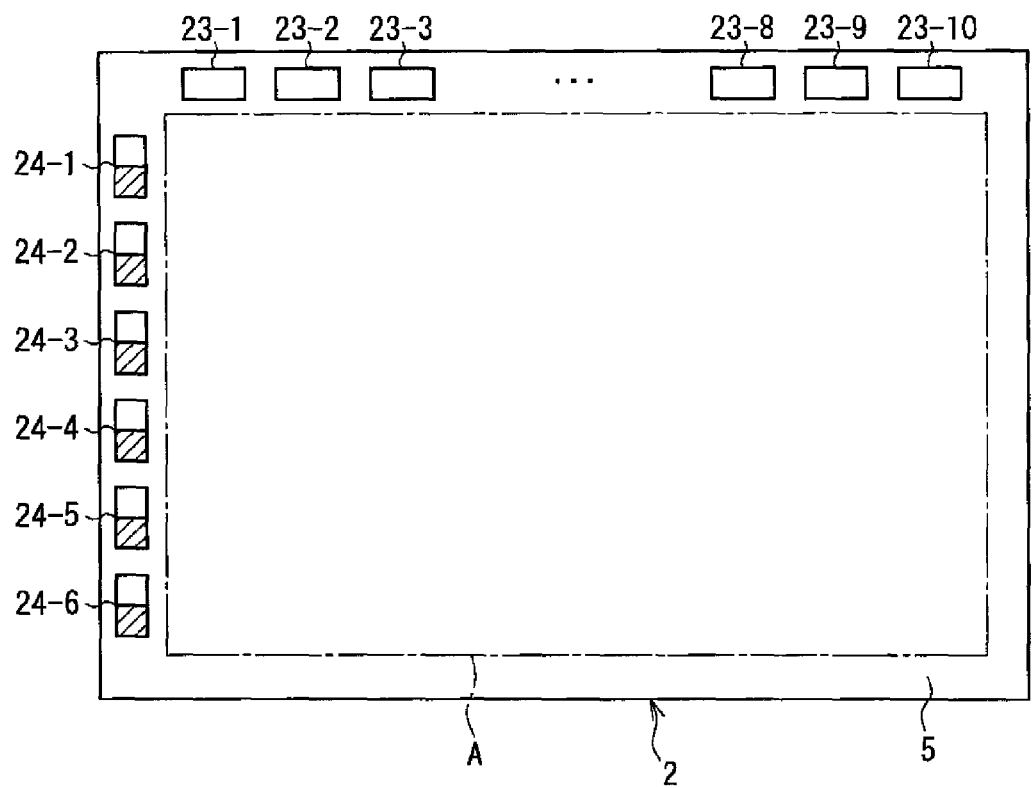
FIG. 3 is a view illustrating a specific configuration of the active matrix substrate.

In FIGS. 2 and 3, the liquid crystal display device 1 (FIG. 1) includes a panel control portion 22 that controls the driving of the liquid crystal panel 2 (FIG. 1) as a display portion for displaying information such as characters and images, and a plurality of (for example, ten) source drivers 23-1, 23-2, ..., 23-9, and 23-10 (hereinafter, collectively referred to as "23") and a plurality of (for example, six) gate drivers 24-1, 24-2, ..., 24-5, and 24-6 (hereinafter, collectively referred to as "24") that are operated based on instruction signals from the panel control portion 22.

The panel control portion 22 is provided in the drive circuit device 10 (FIG. 1) and receives a video signal from the outside of the liquid crystal display device 1. Further, the panel control portion 22 includes an image processing portion 22a that performs predetermined image processing on the input video signal and generates the instruction signals respectively for the source drivers 23 and the gate drivers 24, and a frame buffer 22b that can store display data for one frame included in the input video signal. When the panel control portion 22 controls the driving of the source drivers 23 and the gate drivers 24 according to the input video signal, information in accordance with the video signal is displayed on the liquid crystal panel 2.

The source drivers 23 and the gate drivers 24 are provided in the drive device 9 (FIG. 1) and are located on the active matrix substrate 5 of the present embodiment that forms an array substrate. Specifically, on a surface of the active matrix substrate 5, the source drivers 23-1 to 23-10 are located linearly along a lateral direction of the liquid crystal panel 2 in a region outside an effective display region A of the liquid crystal panel 2 as a display panel. Further, on the surface of the active matrix substrate 5, the gate drivers 24-1 to 24-6 are located linearly along a longitudinal direction (scanning direction to be described later) of the liquid crystal panel 2 in a region outside the effective display region A.

Further, the source drivers 23 and the gate drivers 24 serve as drive circuits for driving a plurality of pixels P provided in the liquid crystal panel 2 on a pixel basis and are connected with a plurality of source wirings S1 to SM (M is an integer of 10 or more; hereinafter, collectively referred to as "S") and a plurality of gate wirings G1 to GN (N is an integer of 6 or more; hereinafter, collectively referred to as "N"), respectively. Each of the source drivers 23-1 to 23-10 is connected with an equal number of the source wirings S, and each of the gate drivers 24-1 to 24-6 is connected with an equal number of the gate wirings G.

In other words, each of the source drivers 23-1 to 23-10 is connected with the (M/10) source wirings S each of which functions as a data wiring to which a voltage signal in accordance with the video signal is input from the source driver 23. Further, each of the gate drivers 24-1 to 24-6 is connected with the (N/6) gate wirings G each of which functions as a scanning wiring to which scanning signals are input sequentially from the gate driver 24 as a scanning wiring drive circuit, so that a scanning operation is performed.

Further, in each of the gate drivers 24-1 to 24-6, the number of a terminal that is corrected to the gate wiring G and the number of a vacant terminal that is not connected to the gate wiring G, as shown in FIG. 3 without hatching and with hatching, respectively are set to be ½ of the number of the entire terminals (details will be described later).

Further, the source wirings S and the gate wirings G are arranged in a matrix at least in the effective display region A, and regions of a plurality of the pixels P are formed in respective areas partitioned in a matrix. Specifically, as shown in FIG. 2 as an example, the source wirings S include source wiring main body portions S1b, S2b, S3b, and ... that are arranged in parallel with the longitudinal direction of the liquid crystal panel 2, and connection wiring portions S1a, S2a, S3a, and ... that respectively connect the source wiring main body portions S1b, S2b, S3b, and ... and the corresponding source drivers 23-1 to 23-10 in the shortest possible distances. Similarly, the gate wirings G include gate wiring main body portions G1b, G2b, and ... that are arranged in parallel with the lateral direction of the liquid crystal panel 2, and connection wiring portions G1a, G2a, and ... that respectively connect the gate wiring main body portions G1b, G2b, and ... and the corresponding gate drivers 24-1 to 24-6 in the shortest possible distances.

In the source wirings S and the gate wirings G, the source wiring main body portions S1b, S2b, S3b, and ... and the gate wiring main body portions G1b, G2b, and ... are arranged in a matrix. Since the connection wiring portions S1a, S2a, S3a, and ... connect the source wiring main body portions S1b, S2b, S3b, and ... and the corresponding source drivers 23-1 to 23-10 in the shortest possible distances, the connection wiring portions S1a, S2a, S3a, and ... have the smallest possible resistance value. Similarly, since the connection wiring portions G1a, G2a, and ... connect the gate wiring main body portions G1b, G2b, and ... and the corresponding gate drivers 24-1 to 24-6 in the shortest possible distances, the connection wiring portions G1a, G2a, and ... have the smallest possible resistance value.

A plurality of the pixels P include red, green, and blue pixels. The red, green, and blue pixels are provided sequentially in this order, for example, in parallel with the gate wiring main body portions G1b, G2b, and ... of the gate wirings G.

Further, each of the gate wiring main body portions G1a, G2a, and ... is connected with a gate of a switching element 25 that is provided for each of the pixels P. On the other hand, each of the source wiring main body portions S1b, S2b, S3b, and ... is connected with a source of the switching element 25. A drain of the switching element 25 is connected with a pixel electrode 26 that is provided for each of the pixels P. In each of the pixels P, a common electrode 27 is formed so as to be opposed to the pixel electrode 26 with the liquid crystal layer 4 (FIG. 1) of the liquid crystal panel 2 sandwiched therebetween. Based on the instruction signals from the image processing portion 22a, the gate drivers 24 sequentially output scanning signals to the gate wirings G1 to GN so as to turn on the gates of the corresponding switching elements 25. On the other hand, the source drivers 23 output the voltage signal (gray-scale voltage) in accordance with the brightness (gray-scale) of a display image to the corresponding source wirings S1 to SM based on the instruction signals from the image processing portion 22a.

Next, the gate drivers 24 of the present embodiment will be described specifically with reference to FIG. 4.

Figure 4:
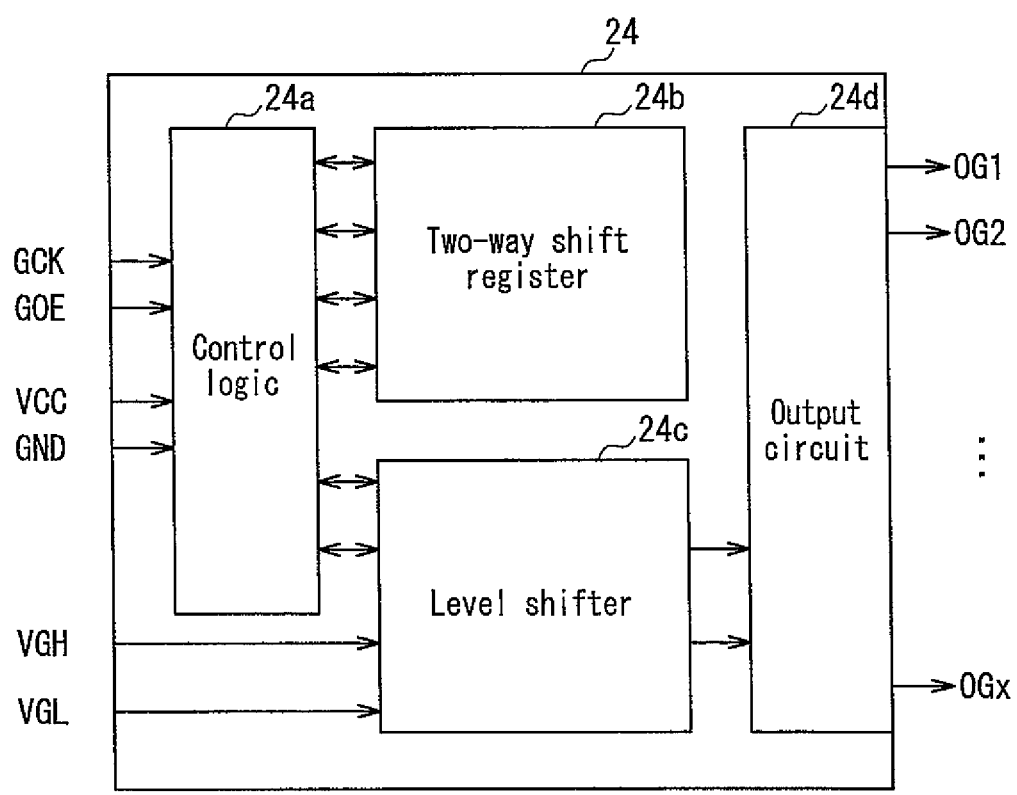
FIG. 4 is a block diagram showing a specific configuration of a gate driver shown in FIG. 3.

FIG. 4 is a block diagram showing a specific configuration of each of the gate drivers shown in FIG. 3.

As shown in FIG. 4, each of the gate drivers 24 includes a control logic 24a to which the instruction signal from the image processing portion 22a (FIG. 2) is input, a two-way shift register 24b and a level shifter 24c that are connected to the control logic 24a, and an output circuit 24d that has a plurality of (for example, X (X is an integer of 2 or more)) terminals OG1, OG2, ..., and OGx for outputting the scanning signals and is connected to the level shifter 24c.

The control logic 24a receives a vertical shift clock signal GCK and an output enable signal GOE from the image processing portion 22a. Further, the control logic 24a is supplied with a high-level side power supply voltage VCC and a low-level side power supply voltage GND for the logic, and generates a control signal required for driving the two-way shift register 24b based on the instruction signal from the image processing portion 22a, thereby operating the two-way shift register 24b.

In accordance with the control signal from the control logic 24a, the two-way shift register 24b outputs a start signal to the level shifter 24c so as to start outputting the scanning signals through the control logic 24a. Further, the two-way shift register 24b sequentially outputs the scanning signals to the level shifter 24c.

The level shifter 24c is supplied with a high-level side power supply voltage VGH and a low-level side power supply voltage VGL for driving liquid crystal. Further, when receiving the start signal followed by the scanning signals sequentially from the two-way shift register 24b, the level shifter 24c shifts the level of the scanning signals between a high level and a low level sequentially, and sequentially outputs the scanning signals to the output circuit 24d. Thus, the level shifter 24c allows the scanning signals to be output from the output circuit 24d in predetermined scanning directions.

In the output circuit 24d, only X/2 of the X terminals OG1, OG2, ..., and OGx are connected to the gate wirings G as shown in FIG. 3 without hatching and with hatching. In other words, in the output circuit 24d, only the terminals OG1 to OG(x/2) provided on the upper side in FIG. 3 are connected to the gate wirings G, and the terminals OG(x/2+1) to OGx provided on the lower side in FIG. 3 are not connected to the gate wirings G as vacant terminals. When receiving the start signal, the output circuit 24d sequentially outputs the scanning signals in the order from the terminal OG1 to the terminal OGx (i.e., in a scanning direction from the upper side to the lower side in FIG. 3).

Further, the six gate drivers 24-1 to 24-6 are configured to output the scanning signals sequentially in the order in which they are provided along the scanning direction from the upper side to the lower side in FIG. 3, which will be described in detail later.

An operation of the liquid crystal display device 1 of the present embodiment configured as described above will be described specifically with reference to FIG. 5. It should be noted that the following description is directed mainly to a scanning operation by the gate drivers 24-1 to 24-6.

Figure 5:
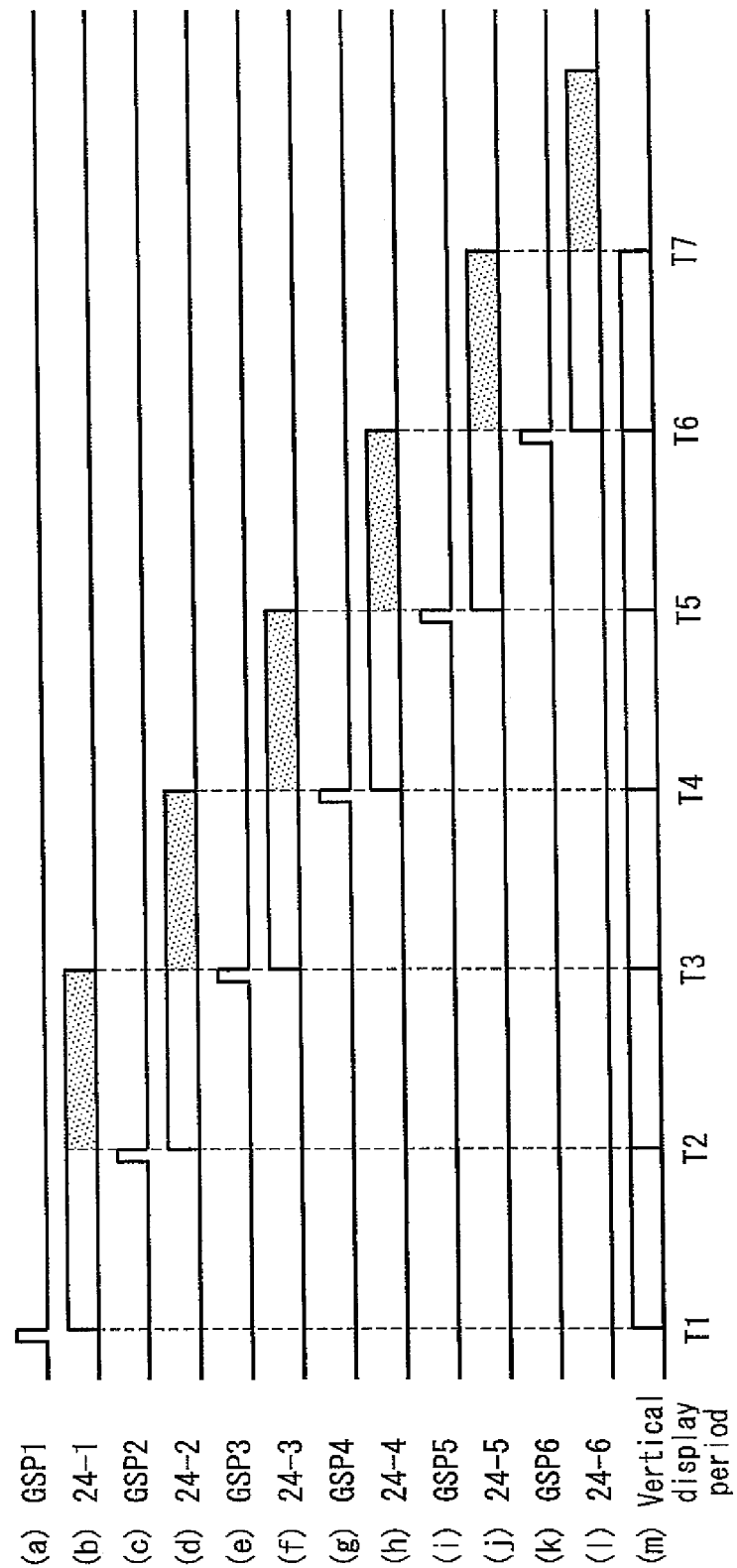
FIG. 5 is a timing chart showing a scanning operation in the active matrix substrate.

FIG. 5 is a timing chart showing a scanning operation in the active matrix substrate.

When the image processing portion 22a outputs an instruction signal GSP1 that instructs the top gate driver 24-1 to start a scanning operation as indicated by (a) in FIG. 5, the gate driver 24-1 starts outputting the scanning signals sequentially from the terminal OG1 at a time point T1 and outputs the scanning signal from the terminal OG(x/2) at a time point T2 as indicated by (b) in FIG. 5. Then, when the scanning signals are output completely from the terminals OG1 to OG(x/2) connected to the gate wirings G, a scanning operation is performed in a display region including the gate wirings G connected to the gate driver 24-1 between the time point T1 and the time point T2 as indicated by (m) in FIG. 5. Further, in the gate driver 24-1, during a period between the time point T2 and a time point T3 (a hatched period in the figure), the scanning signals are output to the vacant terminals OG(x/2+1) to OGx. However, since these vacant terminals OG(x/2+1) to OGx are not connected to the gate wirings G, they do not contribute to a display operation on the liquid crystal panel 2 (the same applies to the gate drivers 24-2 to 24-6).

Next, when the image processing portion 22a outputs an instruction signal GSP2 that instructs the second gate driver 24-2 from the top to start a scanning operation just before the time point T2 as indicated by (c) in FIG. 5, the gate driver 24-2 starts outputting the scanning signals sequentially from the terminal OG1 at the time point T2 and outputs the scanning signal from the terminal OG(x/2) at the time point T3 as indicated by (d) in FIG. 5. Then, when the scanning signals are output completely from the terminals OG1 to OG(x/2) connected to the gate wirings G, a scanning operation is performed in a display region including the gate wirings G connected to the gate driver 24-2 between the time point T2 and the time point T3 as indicated by (m) in FIG. 5.

Then, when the image processing portion 22a outputs an instruction signal GSP3 that instructs the third gate driver 24-3 from the top to start a scanning operation just before the time point T3 as indicated by (e) in FIG. 5, the gate driver 24-3 starts outputting the scanning signals sequentially from the terminal OG1 at the time point T3 and outputs the scanning signal from the terminal OG(x/2) at a time point T4 as indicated by (f) in FIG. 5. Then, when the scanning signals are output completely from the terminals OG1 to OG(x/2) connected to the gate wirings G, a scanning operation is performed in a display region including the gate wirings G connected to the gate driver 24-3 between the time point T3 and the time point T4 as indicated by (m) in FIG. 5.

Thereafter, when the image processing portion 22a outputs an instruction signal GSP4 that instructs the fourth gate driver 24-4 from the top to start a scanning operation just before the time point T4 as indicated by (g) in FIG. 5, the gate driver 24-4 starts outputting the scanning signals sequentially from the terminal OG1 at the time point T4 and outputs the scanning signal from the terminal OG(x/2) at a time point T5 as indicated by (h) in FIG. 5. Then, when the scanning signals are output completely from the terminals OG1 to OG(x/2) connected to the gate wirings G, a scanning operation is performed in a display region including the gate wirings G connected to the gate driver 24-4 between the time point T4 and the time point T5 as indicated by (m) in FIG. 5.

Then, when the image processing portion 22a outputs an instruction signal GSP5 that instructs the fifth gate driver 24-5 from the top to start a scanning operation just before the time point T5 as indicated by (i) in FIG. 5, the gate driver 24-5 starts outputting the scanning signals sequentially from the terminal OG1 at the time point T5 and outputs the scanning signal from the terminal OG(x/2) at a time point T6 as indicated by (j) in FIG. 5. Then, when the scanning signals are output completely from the terminals OG1 to OG(x/2) connected to the gate wirings G, a scanning operation is performed in a display region including the gate wirings G connected to the gate driver 24-5 between the time point T5 and the time point T6 as indicated by (m) in FIG. 5.

After that, when the image processing portion 22a outputs an instruction signal GSP6 that instructs the sixth gate driver 24-6 from the top to start a scanning operation just before the time point T6 as indicated by (k) in FIG. 5, the gate driver 24-6 starts outputting the scanning signals sequentially from the terminal OG1 at the time point T6 and outputs the scanning signal from the terminal OG(x/2) at a time point T7 as indicated by (l) in FIG. 5. Then, when the scanning signals are output completely from the terminals OG1 to OG(x/2) connected to the gate wirings G, a scanning operation is performed in a display region including the gate wirings G connected to the gate driver 24-6 between the time point T6 and the time point T7 as indicated by (m) in FIG. 5. Consequently, one scanning operation on the entire liquid crystal panel 2 is completed.

In the active matrix substrate 5 of the present embodiment configured as described above, the six gate drivers (scanning wiring drive circuits) 24-1 to 24-6 are provided linearly along the scanning direction. Further, each of the gate drivers 24-1 to 24-6 includes the vacant terminals that are not connected to the gate wirings (scanning wirings) G1 to GN. Thus, according to the active matrix substrate 5 of the present embodiment, even when the panel is made larger, it is possible to suppress an increase in the resistance value of the connection wirings (connection wiring portions G1a, G2a, . . . ) that connect the scanning wiring drive circuits (gate drivers 24) and the scanning wirings (gate wiring main body portions G1b, G2b, . . . ), unlike the conventional example. Consequently, in the present embodiment, it is possible to configure easily the active matrix substrate 5 that enables a suitable scanning operation even when the panel is made larger, unlike the conventional example.

Namely, the present embodiment uses the six gate drivers in each of which only X/2 of the X terminals OG1, OG2, . . . , and OGx are connected to the gate wirings G, while the conventional example uses the three gate drivers in each of which all the X terminals are connected to the gate wirings. In this case, in the conventional example, since the entire active matrix substrate is driven by the three gate drivers, a maximum length of the scanning wirings is ⅓ of the length of the active matrix substrate in a vertical direction. On the other hand, in the present embodiment, since the entire active matrix substrate is driven by the six gate drivers, a maximum length of the scanning wirings is ⅙ of the length of the active matrix substrate in a vertical direction. Thus, as compared with the conventional example, it is possible to suppress by half the resistance value of the connection wirings (connection wiring portions G1a, G2a, . . . ) that connect the scanning wiring drive circuits (gate drivers 24) and the scanning wirings (gate wiring main body portions G1b, G2b, . . . ).

Further, in the liquid crystal display device 1 of the present embodiment, the active matrix substrate 5 that enables a suitable scanning operation even when the panel is made larger is used in the liquid crystal panel (display portion) 2. Thus, it is possible to configure easily the liquid crystal display device 1 that has excellent display performance even in the case of achieving a larger screen and/or higher definition.

SECOND EMBODIMENT

Figure 6:
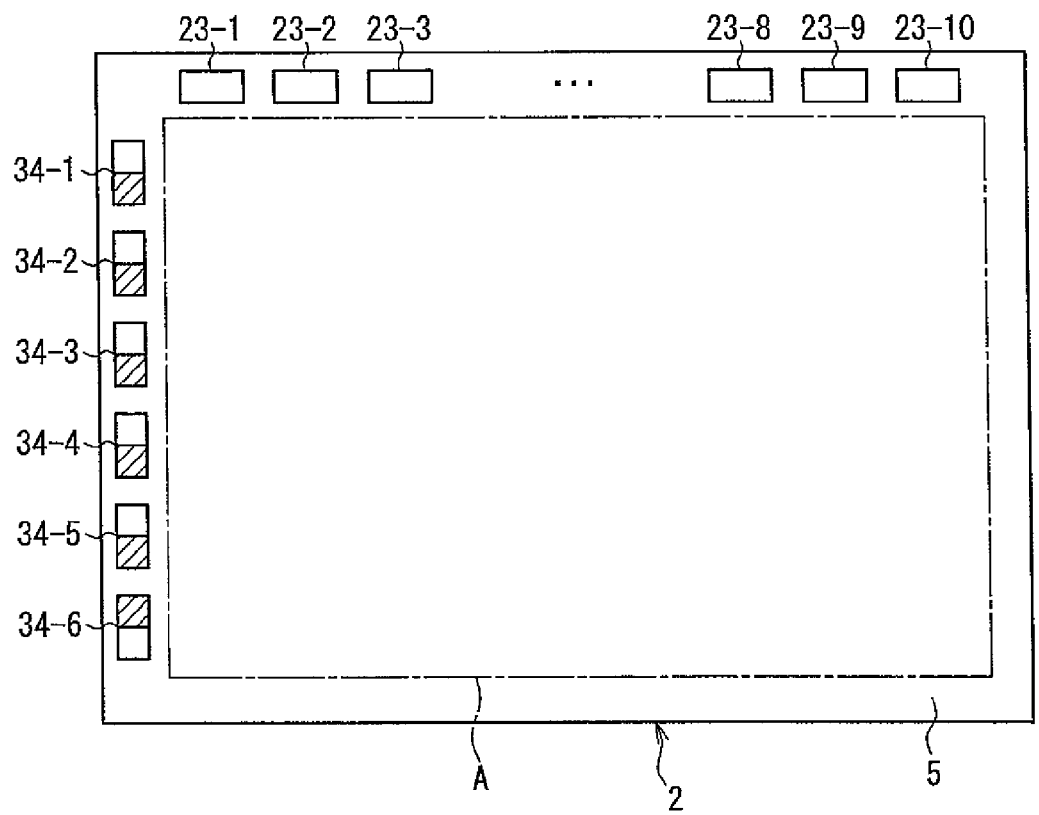
FIG. 6 is a view illustrating a specific configuration of an active matrix substrate according to a second embodiment of the present invention.

FIG. 6 is a view illustrating a specific configuration of an active matrix substrate according to a second embodiment of the present invention. In the figure, the present embodiment is different from the first embodiment mainly in that the terminal that is connected to gate wiring and the vacant terminal that is not connected to the gate wiring are provided sequentially in this order along a scanning direction in a gate driver provided on one end side of the scanning direction, while the vacant terminal that is not connected to the gate wiring and the terminal that is connected to the gate wiring are provided sequentially in this order along the scanning direction in a gate driver provided on the other end side of the scanning direction. It should be noted that the same elements as those in the first embodiment are denoted with the same reference numerals, and the repeated description thereof will be omitted.

Namely, as shown in FIG. 6 as an example, on a surface of the active matrix substrate 5 of the present embodiment, six gate drivers 34-1 to 34-6 (hereinafter, collectively referred to as "34") are located linearly along a longitudinal direction (scanning direction) of the liquid crystal panel 2 in a region outside the effective display region A. Each of the gate drivers 34-1 to 34-6 is connected with an equal number of the gate wirings G as in the first embodiment.

Further, in each of the gate drivers 34-1 to 34-6, the number of the terminal that is corrected to the gate wiring G and the number of the vacant terminal that is not connected to the gate wiring G, as shown in FIG. 6 without hatching and with hatching, respectively are set to be ½ of the number of the entire terminals. However, according to the active matrix substrate 5 of the present embodiment, as shown in FIG. 6 as an example, in the gate drivers 34-1 and 34-6 that are provided respectively on the upper side (the one end side of the scanning direction) and the lower side (the other end side of the scanning direction) in FIG. 6, the terminal that is connected to the gate wiring G and the vacant terminal that is not connected to the gate wiring G are located at positions different from each other. Consequently, according to the active matrix substrate 5 of the present embodiment, the scanning direction during a scanning operation by the gate drivers 34 can be reversed easily (details will be described later).

Next, the gate drivers 34 of the present embodiment will be described specifically with reference to FIG. 7.

Figure 7:
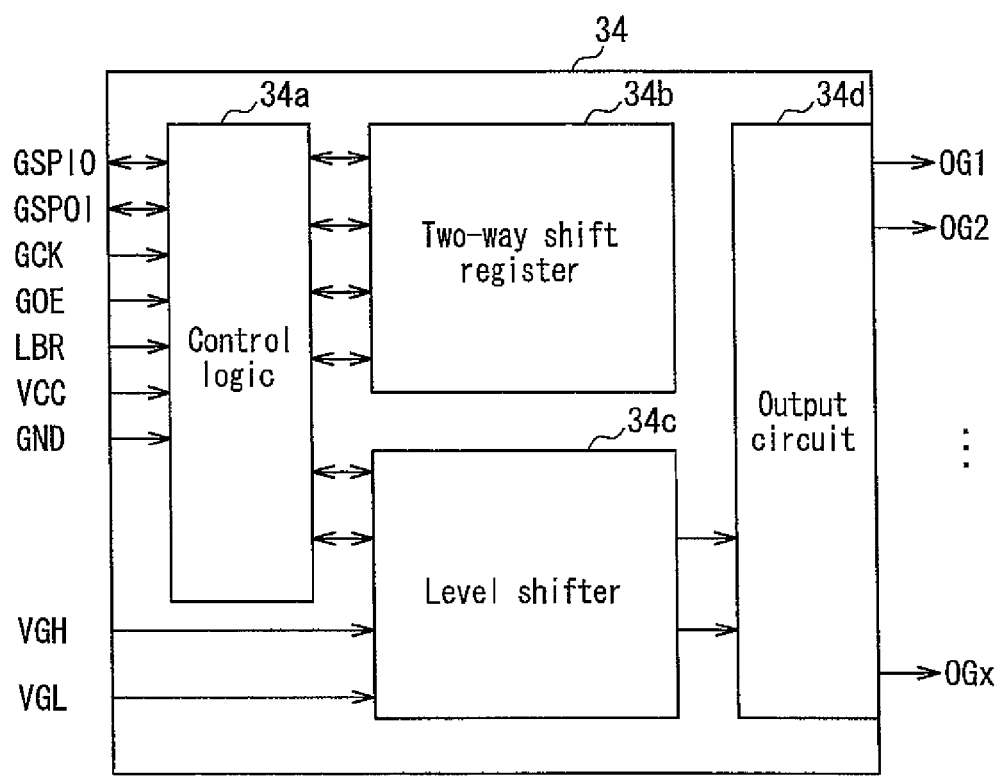
FIG. 7 is a block diagram showing a specific configuration of a gate driver shown in FIG. 6.

FIG. 7 is a block diagram showing a specific configuration of each of the gate drivers shown in FIG. 6.

As shown in FIG. 7, each of the gate drivers 34 includes a control logic 34a to which an instruction signal from the image processing portion 22a (FIG. 2) is input, a two-way shift register 34b and a level shifter 34c that are connected to the control logic 34a, and an output circuit 34d that has X (X is an integer of 2 or more) terminals OG1, OG2, . . . , and OGx for outputting scanning signals and is connected to the level shifter 34c, as in the first embodiment.

Further, as shown in FIG. 6, among the gate drivers 34-1 to 34-6, only the gate drivers 34-6 includes the vacant terminal that is not connected to the gate wiring G and the terminal that is connected to the gate wiring G in this order. In other words, in each of the gate drivers 34-1 to 34-5, among the terminals OG1 to OGx provided in the output circuit 34d, only the terminals OG-1 to OG(x/2) provided on the upper side in FIG. 6 are connected to the gate wirings G, and the terminals OG(x/2+1) to OGx provided on the lower side in FIG. 6 are not connected to the gate wirings G as vacant terminals as in the first embodiment. On the other hand, in the gate driver 34-6, the terminals OG1 to OG(x/2) provided on the upper side in FIG. 6 are not connected to the gate wirings G as vacant terminals, and only the terminals OG(x/2+1) to OGx provided on the lower side in FIG. 6 are connected to the gate wirings G.

Further, the gate drivers 34 are configured so that the scanning direction during a scanning operation can be reversed. Specifically, in each of the gate drivers 34, the control logic 34a includes a terminal for switching the scanning direction. That is, the control logic 34a receives from the image processing portion 22a a switching signal LBR that instructs the control logic 34a to switch between a scanning operation that is performed in a scanning direction from the upper side to the lower side in FIG. 6 (hereinafter, referred to as "normal scanning") and a scanning operation that is performed in a scanning direction from the lower side to the upper side in FIG. 6 (hereinafter, referred to as "reverse scanning"). More specifically, when the switching signal LBR is at a low level/high level, each of the gate drivers 34 performs normal scanning/ reverse scanning.

Further, in each of the gate drivers 34, the control logic 34a includes input/output terminals GSPOI and GSPIO for inputting/outputting a control signal that makes a notification that the scanning signals are started to be output. More specifically, when normal scanning is performed, each of the gate drivers 34 outputs through the input/output terminal GSPIO the control signal that notifies the subsequent gate driver 34 in the scanning direction that the scanning signals are started to be output, and the subsequent gate driver 34 receives the control signal through the input/output terminal GSPOI. When reverse scanning is performed, the control signal that makes a notification that the scanning signals are started to be output is input/output with the input/output terminals GSPOI and GSPIO functioning in reverse manners to how they function in normal scanning.

An operation of the liquid crystal display device 1 of the present embodiment configured as described above will be described specifically with reference to FIGS. 8 to 12. It should be noted that the following description is directed mainly to a scanning operation by the gate drivers 34-1 to 34-6.

Figure 8:
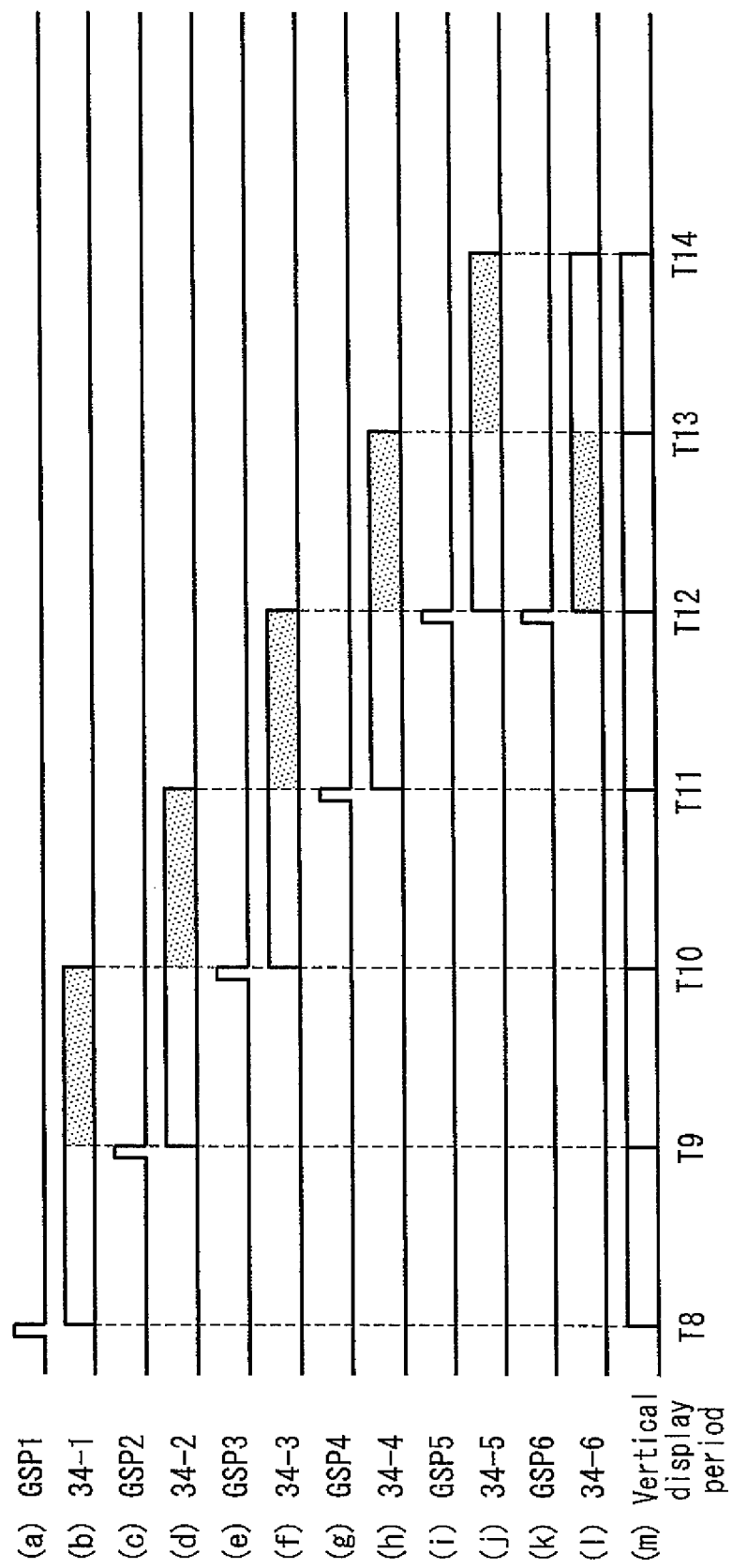
FIG. 8 is a timing chart showing a specific example of a scanning operation in the active matrix substrate shown in FIG. 6.
Figure 9:
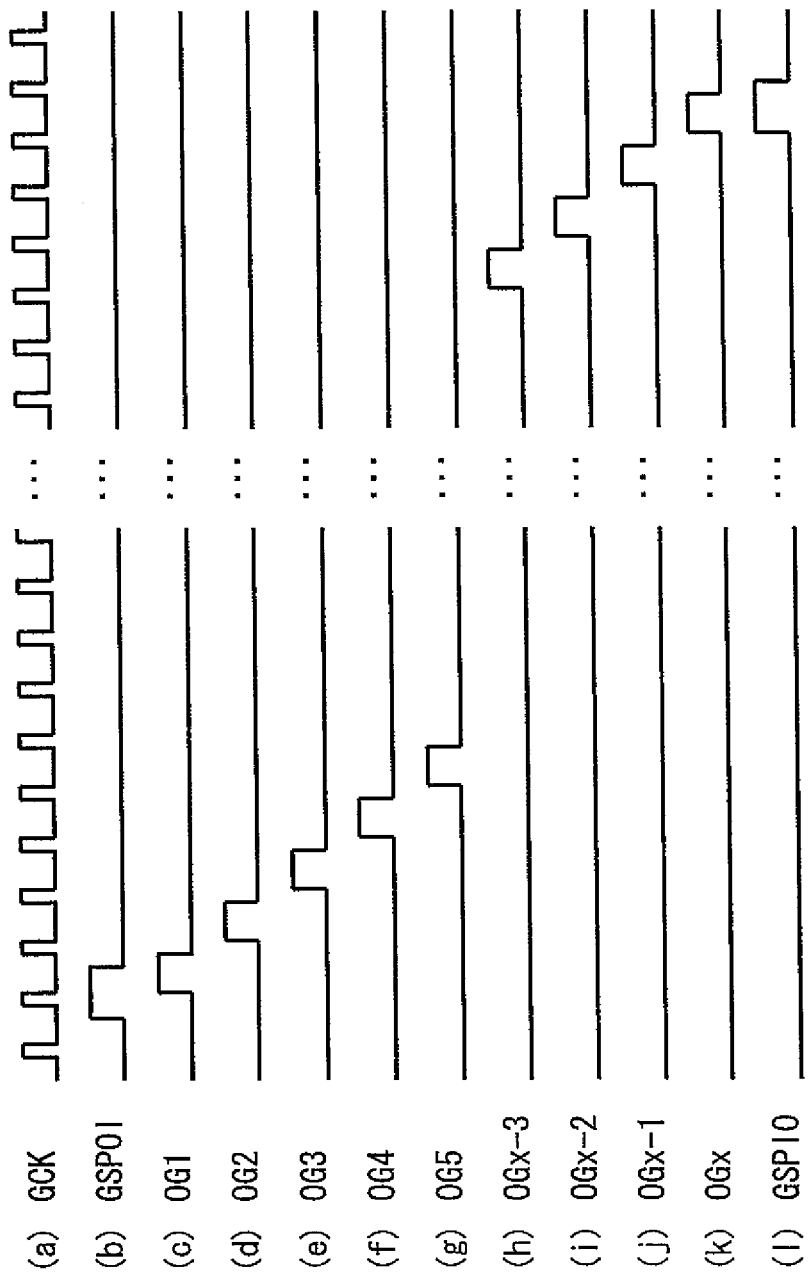
FIG. 9 is a timing chart showing an example of an operation of the gate driver shown in FIG. 7 during the scanning operation shown in FIG. 8.
Figure 10:
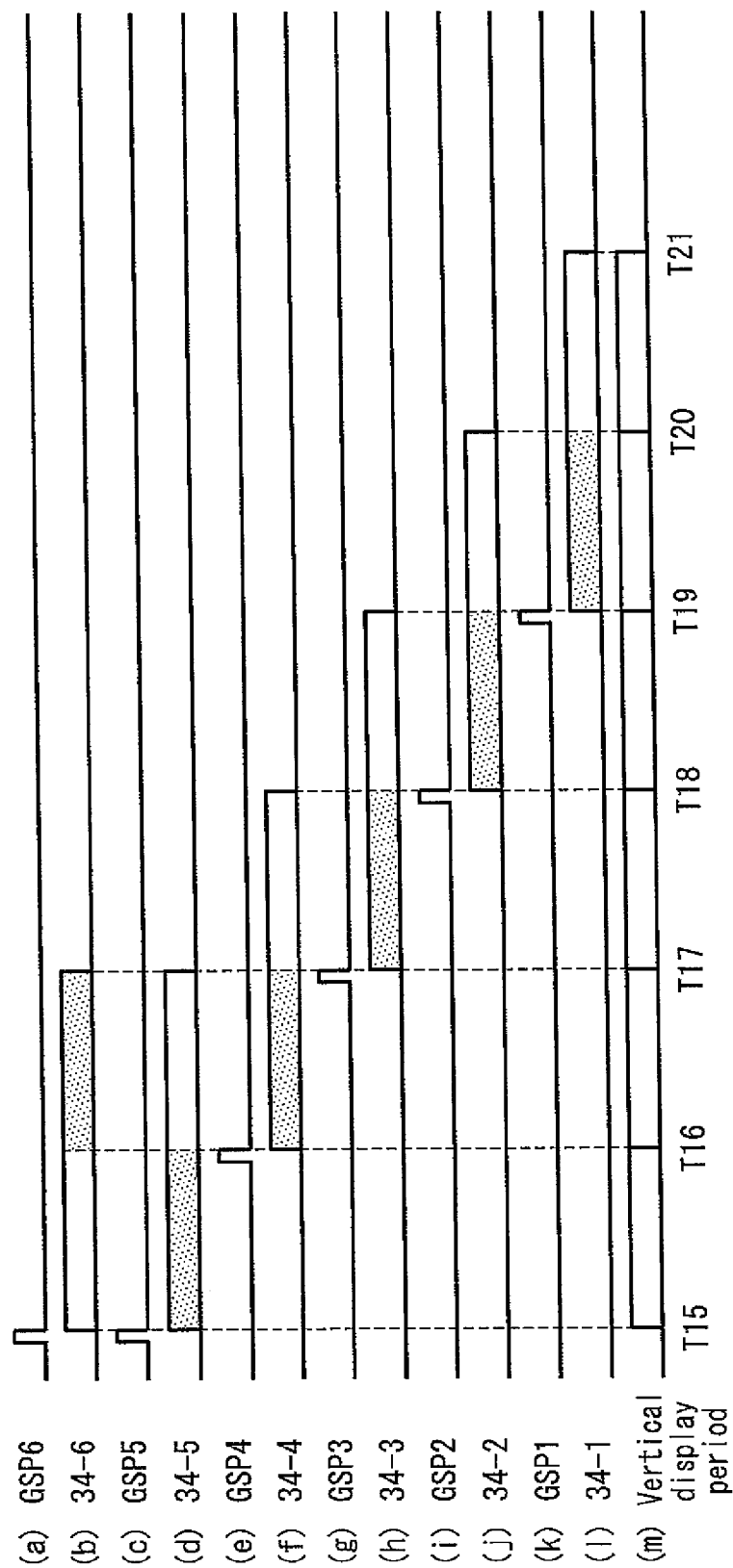
FIG. 10 is a timing chart showing another specific example of the scanning operation in the active matrix substrate shown in FIG. 6.
Figure 11:
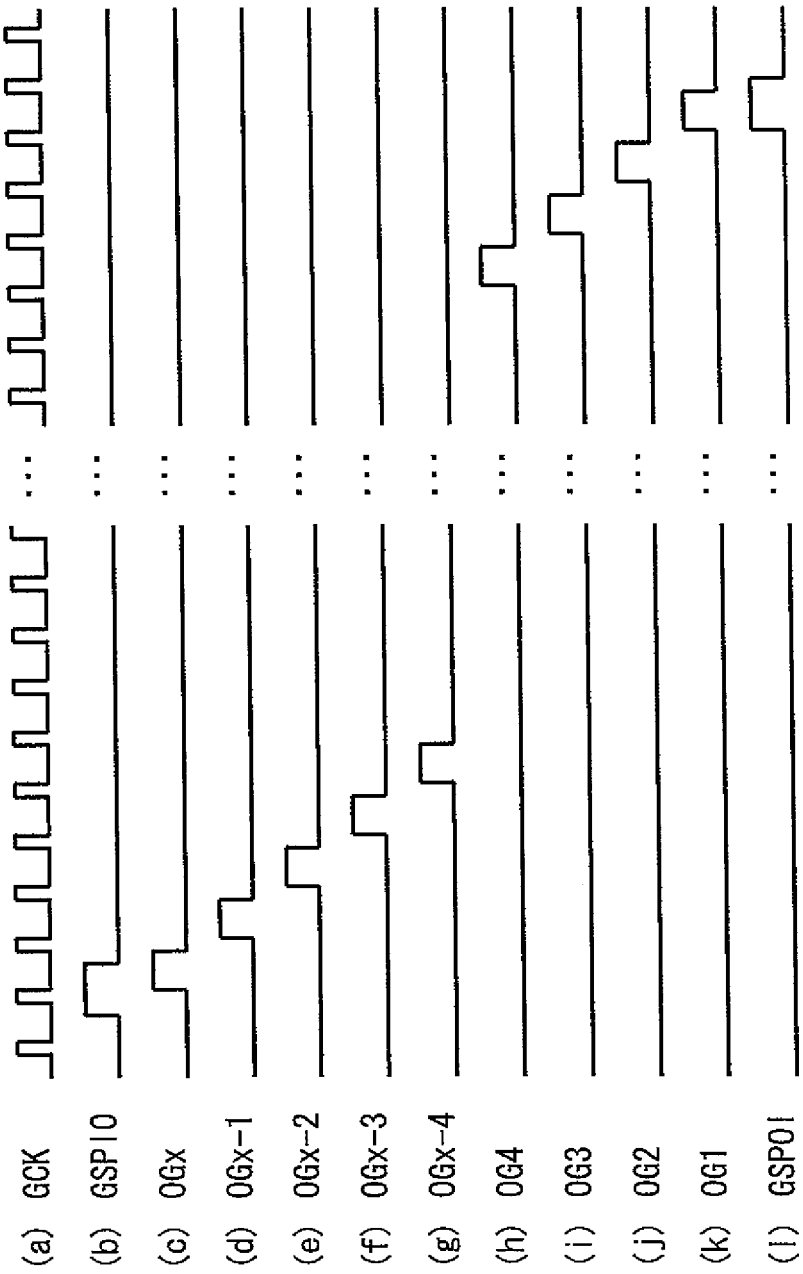
FIG. 11 is a timing chart showing an example of the operation of the gate driver shown in FIG. 7 during the scanning operation shown in FIG. 10.

FIG. 8 is a timing chart showing a specific example of a scanning operation in the active matrix substrate shown in FIG. 6. FIG. 9 is a timing chart showing an example of an operation of the gate driver shown in FIG. 7 during the scanning operation shown in FIG. 8. FIG. 10 is a timing chart showing another specific example of the scanning operation in the active matrix substrate shown in FIG. 6. FIG. 11 is a timing chart showing an example of the operation of the gate driver shown in FIG. 7 during the scanning operation shown in FIG. 10.

First, a scanning operation for performing normal scanning will be described with reference to FIGS. 8 and 9.

When the image processing portion 22a outputs the instruction signal GSP1 that instructs the top gate driver 34-1 to start a scanning operation as indicated by (a) in FIG. 8, the gate driver 34-1 starts outputting the scanning signals sequentially from the terminal OG1 at a time point T8 and outputs the scanning signal from the terminal OG(x/2) at a time point T9 as indicated by (b) in FIG. 8. Then, when the scanning signals are output completely from the terminals OG1 to OG(x/2) connected to the gate wirings G, a scanning operation is performed in a display region including the gate wirings G connected to the gate driver 34-1 between the time point T8 and the time point T9 as indicated by (m) in FIG. 8. Further, in the gate driver 34-1, during a period between the time point T9 and a time point T10 (a hatched period in the figure), the scanning signals are output to the vacant terminals OG(x/2+1) to OGx. However, since these vacant terminals OG(x/2+1) to OGx are not connected to the gate wirings G, they do not contribute to a display operation on the liquid crystal panel 2 (the same applies to the gate drivers 34-2 to 34-5).

Next, when the image processing portion 22a outputs the instruction signal GSP2 that instructs the second gate driver 34-2 from the top to start a scanning operation just before the time point T9 as indicated by (c) in FIG. 8, the gate driver 34-2 starts outputting the scanning signals sequentially from the terminal OG1 at the time point T9 and outputs the scanning signal from the terminal OG(x/2) at the time point T10 as indicated by (d) in FIG. 8. Then, when the scanning signals are output completely from the terminals OG1 to OG(x/2) connected to the gate wirings G, a scanning operation is performed in a display region including the gate wirings G connected to the gate driver 34-2 between the time point T9 and the time point T10 as indicated by (m) in FIG. 8.

Here, a more specific description will be given of the scanning operation by the gate driver 34-2 with reference to FIG. 9 as an example.

When the gate driver 34-2 receives the control signal from the gate driver 34-1 through the input/output terminal GSPOI as indicated by (b) in FIG. 9, the scanning signals are output sequentially from the terminals OG1 to OGx as indicated respectively by (c) to (k) in FIG. 9 in synchronization with the vertical shift clock signal GCK as indicated by (a) in FIG. 9. Further, the gate driver 34-2 outputs the control signal through the input/output terminal GSPIO to the gate driver 34-3 in synchronization with the output of the scanning signal from the terminal OGx. As a result, the gate driver 34-3 is notified that the scanning signals are started to be output from the gate driver 34-2.

Returning to FIG. 8, when the image processing portion 22a outputs the instruction signal GSP3 that instructs the third gate driver 34-3 from the top to start a scanning operation just before the time point T10 as indicated by (e) in FIG. 8, the gate driver 34-3 starts outputting the scanning signals sequentially from the terminal OG1 at the time point T10 and outputs the scanning signal from the terminal OG(x/2) at a time point T11 as indicated by (f) in FIG. 8. Then, when the scanning signals are output completely from the terminals OG1 to OG(x/2) connected to the gate wirings G, a scanning operation is performed in a display region including the gate wirings G connected to the gate driver 34-3 between the time point T10 and the time point T11 as indicated by (m) in FIG. 8.

Then, when the image processing portion 22a outputs the instruction signal GSP4 that instructs the fourth gate driver 34-4 from the top to start a scanning operation just before the time point T11 as indicated by (g) in FIG. 8, the gate driver 34-4 starts outputting the scanning signals sequentially from the terminal OG1 at the time point T11 and outputs the scanning signal from the terminal OG(x/2) at a time point T12 as indicated by (h) in FIG. 8. Then, when the scanning signals are output completely from the terminals OG1 to OG(x/2) connected to the gate wirings G, a scanning operation is performed in a display region including the gate wirings G connected to the gate driver 34-4 between the time point T11 and the time point T12 as indicated by (m) in FIG. 8.

Thereafter, when the image processing portion 22a outputs the instruction signal GSP5 that instructs the fifth gate driver 34-5 from the top to start a scanning operation just before the time point T12 as indicated by (i) in FIG. 8, the gate driver 34-5 starts outputting the scanning signals sequentially from the terminal OG1 at the time point T12 and outputs the scanning signal from the terminal OG(x/2) at a time point T13 as indicated by (j) in FIG. 8. Then, when the scanning signals are output completely from the terminals OG1 to OG(x/2) connected to the gate wirings G, a scanning operation is performed in a display region including the gate wirings G connected to the gate driver 34-5 between the time point T12 and the time point T13 as indicated by (m) in FIG. 8.

According to the active matrix substrate 5 of the present embodiment, in the output circuit 34d of the sixth gate driver 34-6 from the top, the terminals OG1 to OG(x/2) provided on the upper side in FIG. 6 are vacant terminals. Thus, the image processing portion 22a outputs the instruction signal GSP6 that instructs the gate driver 34-6 to start a scanning operation just before the time point T12 as indicated by (k) in FIG. 8. In other words, in the present embodiment, the image processing portion 22a outputs the instruction signals GSP5 and GSP6 at the same timing. Consequently, in the gate driver 34-6, during a period between the time point T12 and the time point T13 (a hatched period in the figure), the scanning signals are output to the vacant terminals OG1 to OG(x/2). However, since these vacant terminals OG1 to OG(x/2) are not connected to the gate wirings G, they do not contribute to a display operation on the liquid crystal panel 2.

Then, the gate driver 34-6 starts outputting the scanning signals sequentially from the terminal OG(x/2+1) at the time point T13 and outputs the scanning signal from the terminal OGx at a time point T14 as indicated by (l) in FIG. 8. Then, when the scanning signals are output completely from the terminals OG(x/2+1) to OGx connected to the gate wirings G, a scanning operation is performed in a display region including the gate wirings G connected to the gate driver 34-6 between the time point T13 and the time point T14 as indicated by (m) in FIG. 8. Consequently, one scanning operation on the entire liquid crystal panel 2 is completed.

Next, a scanning operation for performing reverse scanning will be described with reference to FIGS. 10 and 11.

When the image processing portion 22a outputs the instruction signal GSP6 that instructs the gate driver 34-6 at the bottom to start a scanning operation as indicated by (a) in FIG. 10, the gate driver 34-6 starts outputting the scanning signals sequentially from the terminal OGx at a time point T15 and outputs the scanning signal from the terminal OG(x/2+1) at a time point T16 as indicated by (b) in FIG. 10. Then, when the scanning signals are output completely from the terminals OGx to OG(x/2+1) connected to the gate wirings G, a scanning operation is performed in a display region including the gate wirings G connected to the gate driver 34-6 between the time point T15 and the time point T16 as indicated by (m) in FIG. 10. Further, in the gate driver 34-6, during a period between the time point T16 and a time point T17 (a hatched period in the figure), the scanning signals are output to the vacant terminals OG(x/2) to OG1. However, since these vacant terminals OG(x/2) to OG1 are not connected to the gate wirings G, they do not contribute to a display operation on the liquid crystal panel 2.

According to the active matrix substrate 5 of the present embodiment, in the output circuit 34d of each of the first to fifth gate drivers 34-1 to 34-5 from the top, the terminals OG(x/2+1) to OGx provided on the lower side in FIG. 6 are vacant terminals. Thus, the image processing portion 22a outputs the instruction signal GSP5 that instructs the gate driver 34-5 to start a scanning operation just before the time point T15 as indicated by (c) in FIG. 10. In other words, in the present embodiment, the image processing portion 22a outputs the instruction signals GSP5 and GSP6 at the same timing. Consequently, in the gate driver 34-5, during a period between the time point T15 and the time point T16 (a hatched period in the figure), the scanning signals are output to the vacant terminals OG(x/2+1) to OGx. However, since these vacant terminals OG(x/2+1) to OGx are not connected to the gate wirings G, they do not contribute to a display operation on the liquid crystal panel 2 (the same applies to the gate drivers 34-2 to 34-5).

Then, the gate driver 34-5 starts outputting the scanning signals sequentially from the terminal OG(x/2) at the time point T16 and outputs the scanning signal from the terminal OG1 at the time point T17 as indicated by (d) in FIG. 10. Then, when the scanning signals are output completely from the terminals OG(x/2) to OG1 connected to the gate wirings G, a scanning operation is performed in a display region including the gate wirings G connected to the gate driver 34-5 between the time point T16 and the time point T17 as indicated by (m) in FIG. 10.

Here, a more specific description will be given of the scanning operation by the gate driver 34-5 with reference to FIG. 11 as an example.

When the gate driver 34-5 receives the control signal from the gate driver 34-6 through the input/output terminal GSPIO as indicated by (b) in FIG. 11, the scanning signals are output sequentially from the terminals OGx to OG1 as indicated respectively by (c) to (k) in FIG. 11 in synchronization with the vertical shift clock signal GCK as indicated by (a) in FIG. 11. Further, the gate driver 34-5 outputs the control signal through the input/output terminal GSPOI to the gate driver 34-4 in synchronization with the output of the scanning signal from the terminal OG1. As a result, the gate driver 34-4 is notified that the scanning signals are started to be output from the gate driver 34-5.

Returning to FIG. 10, when the image processing portion 22a outputs the instruction signal GSP4 that instructs the fourth gate driver 34-4 from the top to start a scanning operation just before the time point T16 as indicated by (e) in FIG. 10, the gate driver 34-4 starts outputting the scanning signals sequentially from the terminal OG(x/2) at the time point T17 and outputs the scanning signal from the terminal OG1 at a time point T18 as indicated by (f) in FIG. 10. Then, when the scanning signals are output completely from the terminals OG(x/2) to OG1 connected to the gate wirings G, a scanning operation is performed in a display region including the gate wirings G connected to the gate driver 34-4 between the time point T17 and the time point T18 as indicated by (m) in FIG. 10.

Then, when the image processing portion 22a outputs the instruction signal GSP3 that instructs the third gate driver 34-3 from the top to start a scanning operation just before the time point T17 as indicated by (g) in FIG. 10, the gate driver 34-3 starts outputting the scanning signals sequentially from the terminal OG(x/2) at the time point T18 and outputs the scanning signal from the terminal OG1 at a time point T19 as indicated by (h) in FIG. 10. Then, when the scanning signals are output completely from the terminals OG(x/2) to OG1 connected to the gate wirings G, a scanning operation is performed in a display region including the gate wirings G connected to the gate driver 34-3 between the time point T18 and the time point T19 as indicated by (m) in FIG. 10.

Thereafter, when the image processing portion 22a outputs the instruction signal GSP2 that instructs the second gate driver 34-2 from the top to start a scanning operation just before the time point T18 as indicated by (i) in FIG. 10, the gate driver 34-2 starts outputting the scanning signals sequentially from the terminal OG(x/2) at the time point T19 and outputs the scanning signal from the terminal OG1 at a time point T20 as indicated by (j) in FIG. 10. Then, when the scanning signals are output completely from the terminals OG(x/2) to OG1 connected to the gate wirings G, a scanning operation is performed in a display region including the gate wirings G connected to the gate driver 34-2 between the time point T19 and the time point T20 as indicated by (m) in FIG. 10.

After that, when the image processing portion 22a outputs the instruction signal GSP1 that instructs the top gate driver 34-1 to start a scanning operation just before the time point T19 as indicated by (k) in FIG. 10, the gate driver 34-1 starts outputting the scanning signals sequentially from the terminal OG(x/2) at the time point T20 and outputs the scanning signal from the terminal OG1 at a time point T21 as indicated by (l) in FIG. 10. Then, when the scanning signals are output completely from the terminals OG(x/2) to OG1 connected to the gate wirings G, a scanning operation is performed in a display region including the gate wirings G connected to the gate driver 34-1 between the time point T20 and the time point T21 as indicated by (m) in FIG. 10. Consequently, one scanning operation on the entire liquid crystal panel 2 is completed.

With the above-described configuration, the present embodiment can provide the same function and achieve the same effect as those in the first embodiment. Further, the active matrix substrate 5 of the present embodiment enables normal scanning and reverse scanning suitably as shown in FIGS. 8 and 10 by reversing the scanning direction easily. As a result, with the active matrix substrate 5 of the present embodiment, it is possible to perform upside-down driving easily. On the other hand, with the active matrix substrate 5 of the first embodiment, it is not easy to perform suitable reverse scanning.

Figure 12:
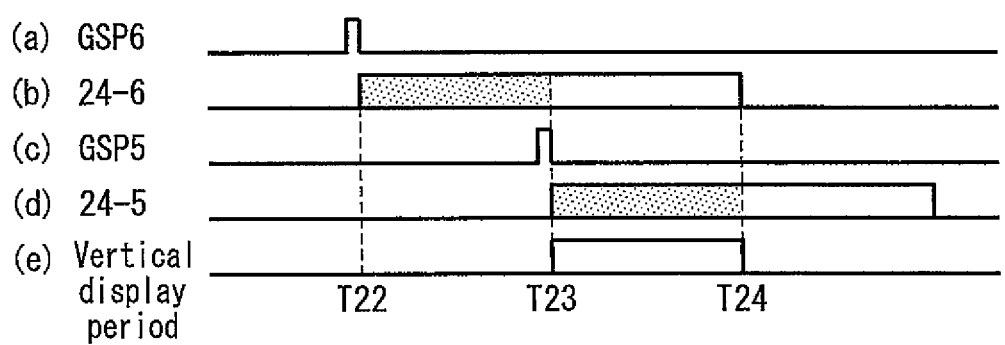
FIG. 12 is a view illustrating a problem to be caused when the scanning operation shown in FIG. 10 is performed in the active matrix substrate shown in FIG. 3.

Specifically, since the terminals OG(x/2+1) to OGx of the gate driver 24-6 are vacant terminals, the image processing portion 22a is required to output the instruction signal GSP6 to the gate driver 24-6 before a period between a time point T23 and a time point T24 during which a scanning operation is performed in a display region including the gate wirings G connected to the gate driver 24-6 as indicated by (e) in FIG. 12. However, it is difficult to output the instruction signal GSP6 at a suitable timing (for example, at a time point T22) before the actual scanning operation is performed. In other words, according to the active matrix substrate 5 of the first embodiment 1, the image processing portion 22a cannot grasp an exact timing of the time point T22, and thus it is not easy to perform suitable reverse scanning It should be noted that the above-described embodiments are illustrative and not limiting. The technical scope of the present invention is specified by the scope of the claims, and any modification falling in the scope of the configuration and equivalent described therein also fall in the technical scope of the present invention.

For example, although the above description explains the cases where the present invention is applied to the transmission type liquid crystal display device, the display device of the present invention is not limited thereto, as long as a display panel provided with an active matrix substrate is used in a display portion. In other words, the display device of the present invention is not limited particularly, as long as it uses an active matrix substrate in which a plurality of data wirings and a plurality of scanning wirings are arranged in a matrix, and a plurality of pixels are provided in the vicinities of intersections of the data wirings and the scanning wirings.

Specifically, the display device of the present invention can be applied to various types of display devices using an active matrix substrate, such as a semi-transmission type or reflection type liquid crystal panel, an organic EL (Electronic Luminescence) element, an inorganic EL element, and a Field Emission Display.

Further, although the above description explains the cases where the six gate drivers (scanning wiring drive circuits) are provided linearly along a scanning direction on one end side of the gate wirings (scanning wirings), the location, number, and the like of the scanning wiring drive circuits are not limited thereto, as long as a plurality of the scanning wiring drive circuits are provided along the scanning direction.

Further, in the above-described second embodiment, the terminal that is connected to the gate wiring (scanning wiring) and the vacant terminal that is not connected to the gate wiring are provided sequentially in this order along a scanning direction in the gate driver (scanning wiring drive circuit) provided on one end side of the scanning direction, while the vacant terminal that is not connected to the gate wiring and the terminal that is connected to the gate wiring are provided sequentially in this order along the scanning direction in the gate driver provided on the other end side of the scanning direction.

However, the present invention is not limited thereto, as long as among a plurality of the scanning wiring drive circuits, in the scanning wiring drive circuit provided on one end side of the scanning direction, the terminal that is connected to the scanning wiring is provided on either one of the one end side and the other end side of the scanning direction, while in the scanning wiring drive circuit provided on the other end side of the scanning direction, the terminal that is connected to the scanning wiring is provided on the other of the one end side and the other end side of the scanning direction. This makes it possible to reverse the scanning direction, so that upside-down driving in which a video is displayed upside down exactly can be performed easily.

Specifically, for example, in the scanning wiring drive circuit provided on one end side of the scanning direction, only the terminal on one endmost side may be a vacant terminal, and the terminal that is connected to the scanning wiring may be provided subsequently to the vacant terminal on the one end side. Alternatively, for example, in the scanning wiring drive circuit provided on one end side of the scanning direction, only the terminal on the other endmost side may be a vacant terminal, and the terminal that is connected to the scanning wiring may be provided subsequently to one end side of the vacant terminal on the other end side, while in the scanning wiring drive circuit provided on the other end side of the scanning direction, only the terminal on the one endmost side may be a vacant terminal, and the terminal that is connected to the scanning wiring may be provided subsequently to the other end side of the vacant terminal on the one end side.

However, the configuration as in the second embodiment is preferred, because it makes it possible to reverse the scanning direction, so that upside-down driving in which a video is displayed upside down exactly can be performed more easily.

Further, although the above description explains the cases where in each of the six gate drivers (scanning wiring drive circuits), the number of the terminal that is corrected to the gate wiring (scanning wiring) and the number of the vacant terminal that is not connected to the gate wiring (scanning wiring) respectively are set to be ½ of the number of the entire terminals, the present invention is not limited thereto, as long as the vacant terminal that is not connected to the scanning wiring is provided in the scanning wiring drive circuit.

However, it is preferred that each of a plurality of the scanning wiring drive circuits has an equal number of the terminal that is connected to the scanning wiring and an equal number of the vacant terminal that is not connected to the scanning wiring as in the above-described embodiments, because this allows all the scanning wiring drive circuits to be loaded uniformly and enables an easy scanning operation.

Further, it is preferred that each of the scanning wiring drive circuits has the terminal that is connected to the scanning wiring and the vacant terminal that is not connected to the scanning wiring in equal numbers as in the above-described embodiments, because this makes it possible to simplify the operation of connecting the scanning wiring drive circuit and the scanning wiring and enables an easier scanning operation.

INDUSTRIAL APPLICABILITY

The present invention is useful for an active matrix substrate that enables a suitable scanning operation even when a panel is made larger, and a high-performance display device using the same.

The invention claimed is:

1. An active matrix substrate for use as a substrate of a display panel, the substrate comprising:

data wirings;

scanning wirings arranged in a matrix;

pixels provided in the vicinities of intersections of the data wirings and the scanning wirings;

scanning wiring drive circuits arranged to sequentially output scanning signals to a plurality of the scanning wirings in a predetermined scanning direction, the scanning wiring drive circuits are provided along the scanning direction; and a control portion arranged to control respective ones of the scanning wiring drive circuits; wherein each of the scanning wiring drive circuits includes a vacant terminal that is not connected to any one of the scanning wirings;

among the scanning wiring drive circuits, in a scanning wiring drive circuit provided on a first end side of the predetermined scanning direction, a terminal that is connected to one of the scanning wirings is provided on either one of the first end side of the scanning direction and a second end side of the scanning direction;

among the scanning wiring drive circuits, in a scanning wiring drive circuit provided on the second end side of the scanning direction, a terminal that is connected to the scanning wiring is provided on the other of the first end side and the second end side of the scanning direction;

the control portion is configured to output instruction signals to the scanning wiring drive circuits so that a first scanning operation in a first scanning direction, in which the first scanning operation is performed from the scanning wiring drive circuit provided on the first end side of the scanning direction to the scanning wiring drive circuit provided on the second end side of the scanning direction, is performed and thereafter a second scanning operation in a second scanning direction, in which the second scanning operation is performed from the scanning wiring drive circuit provided on the second end side of the scanning direction to the scanning wiring drive circuit provided on the first end side of the scanning direction, is performed; and each of the scanning wiring drive circuits includes an equal number of the terminals that are connected to the scanning wiring and an equal number of the vacant terminals that are not connected to any one of the scanning wirings.

2. The active matrix substrate according to claim 1, wherein in the scanning wiring drive circuit provided on the first end side of the scanning direction, the terminal that is connected to the scanning wiring and the vacant terminal that is not connected to any one of the scanning wirings are provided sequentially in this order along the scanning direction, and in the scanning wiring drive circuit provided on the second end side of the scanning direction, the vacant terminal that is not connected to any one of the scanning wirings and the terminal that is connected to the scanning wiring are provided sequentially in this order along the scanning direction.

3. The active matrix substrate according to claim 1, wherein each of the scanning wiring drive circuits includes one of the terminals that are connected to the scanning wiring and the vacant terminals that are not connected to any one of the scanning wirings in equal numbers.

4. A display device provided with a display portion, wherein the active matrix substrate according to claim 1 is used in the display portion.

* * * * *